United States Patent
Neuhaeuser et al.

(10) Patent No.: US 7,754,317 B2
(45) Date of Patent: Jul. 13, 2010

(54) WEATHER-RESISTANT FILM FOR THE YELLOW COLORATION OF RETRO-REFLECTIVE MOULDED BODIES

(75) Inventors: Achim Neuhaeuser, Nauheim (DE); Michael Enders, Dieburg (DE); Guenther Dickhaut-Bayer, Riedstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 256 days.

(21) Appl. No.: 10/593,258

(22) PCT Filed: Dec. 8, 2005

(86) PCT No.: PCT/EP2005/013132
§ 371 (c)(1), (2), (4) Date: Sep. 18, 2006

(87) PCT Pub. No.: WO2006/074766
PCT Pub. Date: Jul. 20, 2006

(65) Prior Publication Data
US 2007/0197703 A1 Aug. 23, 2007

(30) Foreign Application Priority Data
Jan. 14, 2005 (DE) .................. 10 2005 002 072

(51) Int. Cl.
B32B 27/32 (2006.01)
B32B 27/00 (2006.01)
B29C 47/00 (2006.01)

(52) U.S. Cl. .............. 428/220; 428/500; 156/244.11

(58) Field of Classification Search .............. None
See application file for complete search history.

(56) References Cited

U.S. PATENT DOCUMENTS

| | | | |
|---|---|---|---|
| 3,312,655 A * | 4/1967 | Dien .................. 523/307 |
| 5,346,954 A * | 9/1994 | Wu et al. ............ 525/85 |
| 7,371,795 B2 | 5/2008 | Wicker et al. |
| 7,381,552 B2 | 6/2008 | Menzler et al. |
| 7,456,239 B2 | 11/2008 | Theil et al. |
| 2003/0031847 A1 | 2/2003 | Numrich et al. |
| 2004/0104501 A1 | 6/2004 | Petereit et al. |
| 2005/0080188 A1 | 4/2005 | Schultes et al. |
| 2005/0152977 A1 | 7/2005 | Petereit et al. |
| 2005/0164007 A1 | 7/2005 | Numrich et al. |
| 2006/0147714 A1 | 7/2006 | Schultes et al. |
| 2006/0175735 A1 | 8/2006 | Hoess et al. |
| 2007/0055017 A1 | 3/2007 | Schultes et al. |
| 2007/0066708 A1 | 3/2007 | Goldacker et al. |
| 2007/0122624 A1 | 5/2007 | Schultes et al. |
| 2007/0123610 A1 | 5/2007 | Schultes et al. |
| 2007/0185270 A1 | 8/2007 | Arndt et al. |
| 2007/0222117 A1 | 9/2007 | Hoess et al. |
| 2007/0276093 A1 | 11/2007 | Schultes et al. |
| 2008/0132627 A1 | 6/2008 | Schultes et al. |
| 2008/0161469 A1 | 7/2008 | Hoss et al. |
| 2008/0188616 A1 | 8/2008 | Scharz-Barac et al. |
| 2008/0242782 A1 | 10/2008 | Hager et al. |
| 2008/0305335 A1 | 12/2008 | Schultes et al. |

FOREIGN PATENT DOCUMENTS

| DE | 38 42 796 | 6/1990 |
|---|---|---|
| DE | 40 01 856 | 8/1990 |
| DE | 44 02 589 | 8/1994 |
| EP | 0 555 847 | 8/1993 |

OTHER PUBLICATIONS

U.S. Appl. No. 11/816,130, filed Aug. 13, 2007, Numrich, et al.
U.S. Appl. No. 10/570,194, filed Mar. 2, 2006, Numrich, et al.
U.S. Appl. No. 11/721,979, filed Jun. 16, 2007, Goldacker, et al.
U.S. Appl. No. 11/814,704, filed Jul. 25, 2007, Neuhaeuser, et al.
U.S. Appl. No. 11/748,874, filed May 15, 2007, Schultes, et al.
U.S. Appl. No. 12/094,277, filed May 20, 2008, Schultes, et al.
U.S. Appl. No. 60/831,222, filed Jul. 17, 2006, Hager, et al.
U.S. Appl. No. 12/300,408, field Nov. 11, 2008, Hoess, et al.
U.S. Appl. No. 12/665,503, filed Dec. 18, 2009, Numrich, et al.
U.S. Appl. No. 12/092,276, filed May 1, 2008, Numrich, et al.
U.S. Appl. No. 11/912,941, filed Oct. 29, 2007, Guenanten, et al.

* cited by examiner

Primary Examiner—Sheeba Ahmed
(74) Attorney, Agent, or Firm—Oblon, Spivak, McClelland, Maier & Neustadt, L.L.P.

(57) ABSTRACT

The present invention relates to a foil encompassing at least one PMMA layer coloured with a yellow anthraquinone dye, where the chromaticity coordinates (x;y) in the CIE 1931 Standard Colorimetric System of the PMMA layer are within the range of $0.4 \leq x \leq 0.54$ and $0.44 \leq y \leq 0.54$, where the concentration of the yellow dye of the PMMA layer is at least 3% by weight, based on the total weight of the PMMA layer.

19 Claims, No Drawings

WEATHER-RESISTANT FILM FOR THE YELLOW COLORATION OF RETRO-REFLECTIVE MOULDED BODIES

BACKGROUND OF THE INVENTION

1. Field of the Invention

The present invention relates to a weathering-resistant foil for yellow colouring of retroreflective mouldings, to yellow-coloured retroreflective mouldings, and also to the use of these articles.

2. Description of Related Art

The use of retroreflective mouldings for production of traffic signs is well known. By way of example, the publication EP-A-0 609 880 describes the production of specific retroreflective articles which can be used for that purpose. A significant factor is often the use of a highly specific colour, which enables travellers to see the significance of the various signs from a great distance. The mouldings described in EP-A-0 609 880 can be coloured with commonly used colours or else with combinations thereof. That specification moreover sets out all of the types of plastic usually used to produce these mouldings. That specification does not provide any concrete teaching for production of specific mouldings, i.e. in particular orange-coloured mouldings.

EP-A-0 659 829 provides, inter alia, the use of foils composed of polymethyl methacrylate plastics. It says specific moulding compositions can be processed to give particularly weathering-resistant foils. However, that publication gives absolutely no indication of any colouring of these foils. If certain shades are then generated in the usual way, i.e. in particular the yellow tone of direction signs, the result is rapid fading of this colouring.

BRIEF SUMMARY OF THE INVENTION

In the light of the prior art stated and discussed herein, an object of the present invention was therefore to provide foils which can be used for production of yellow-coloured weathering-resistant retroreflective mouldings.

The foils should have not only high weathering resistance but also high durability and good processability.

Another object of the present invention was to provide foils with excellent optical quality which also is retained for a very long time.

The inventive foils should moreover be capable of simple and low-cost production. This should in particular be possible on readily obtainable plant, thus permitting large-scale industrial manufacture.

DETAILED DESCRIPTION OF THE INVENTION

These objects, and also other objects which although not explicitly mentioned are self-evidently derivable from the circumstances discussed herein or are an inevitable result of those circumstances, are achieved via the foils described in claim 1. Advantageous embodiments of the inventive foils are protected by the claims dependent on claim 1. With respect to the process for production of these foils, and also the retroreflective mouldings, claims 15 and 16 achieve the objects set.

If the concentration of a yellow anthraquinone dye which is present in the PMMA layer is at least 3% by weight, the foils obtained encompassing at least one PMMA layer coloured with a yellow anthraquinone dye, where the chromaticity coordinates of the PMMA layer (x;y) of the retroreflective moulding to ISO 3864 are within the "yellow" region of the spectrum whose corner points are 1 ($x=0.519$, $y=0.480$); 2 ($x=0.468$, $y=0.442$); 3 ($x=0.427$, $y=0.483$); 4 ($x=0.465$, $y=0.534$) have particularly high colourfastness on irradiation with UV light. It is clear here to the person skilled in the art in the sector that this measurement takes place on the finished composite composed of the yellow-coloured PMMA layer and of the retroreflective substrate.

The following advantages are moreover achieved via the inventive measures, inter alia:

Retroreflective mouldings obtainable via the use of the inventive foils exhibit good durability, in particular high weathering resistance. These are moreover in particular also capable of use for a long period with high exposure to UV radiation, without any visible bleaching of the dye.

The inventive foils have good mechanical properties. The foils provided via the invention therefore have excellent processing properties, as also do the retroreflective composites obtainable therefrom. These therefore can also be processed on machines that are readily obtainable and widely used, without any need for particular precautionary measures.

The inventive foils exhibit excellent optical properties. Among these are, inter alia, high transmittance.

The inventive foils can easily be produced via conventional methods. Particularly low-cost and large-industrial-scale methods can therefore be used to obtain the inventive foils.

The inventive foils encompass at least one PMMA layer coloured with a yellow anthraquinone dye. The polymethyl methacrylates (PMMAs) used for production of this layer are known per se. Polymethyl methacrylates are polymers obtainable via polymerization of monomers which encompass methyl methacrylate. Preferred polymethyl methacrylates are capable of thermoplastic processing, and these are often termed PMMA moulding composition, where these moulding compositions can encompass other constituents.

Particularly preferred PMMA moulding compositions comprise at least 60% by weight, based on the total weight of the moulding composition, of polymers obtainable via polymerization of monomer compositions which comprise at least 20% by weight, preferably at least 40% by weight, in particular at least 80% by weight and very particularly preferably at least 95% by weight, of methyl methacrylate. The proportion of these preferred matrix polymers is at least 80% by weight in particular embodiments.

The monomer compositions may comprise, besides methyl methacrylate, other monomers which are copolymerizable with methyl methacrylate. Among these are other (meth)acrylates.

The expression (meth)acrylates encompasses methacrylates and acrylates, and also mixtures of the two. These monomers are well known.

Among these are, inter alia, (meth)acrylates which derive from saturated alcohols, e.g. methyl acrylate, ethyl (meth)acrylate, propyl (meth)acrylate, n-butyl (meth)acrylate, tert-butyl (meth)acrylate, pentyl (meth)acrylate and 2-ethylhexyl (meth)acrylate; (meth)acrylates which derive from unsaturated alcohols, e.g. oleyl (meth) acrylate, 2-propynyl (meth)acrylate, allyl (meth)acrylate, vinyl (meth)acrylate; aryl (meth)acrylates, such as benzyl (meth)acrylate or phenyl (meth)acrylate, where each aryl radical may be unsubstituted or have up to four substituents; cycloalkyl (meth)acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate; glycol di(meth)acrylates, such as 1,4-butanediol (meth)acrylate, (meth)acrylates of ether alcohols, e.g. tetrahydrofurfuryl (meth)acrylate, vinyloxyethoxyethyl (meth)acrylate; amides and nitriles of (meth)acrylic acid, e.g. N-(3-dimethylaminopropyl)(meth)acrylamide, N-(diethylphosphono)(meth)acrylamide, 1-methacryloylamido-2-methyl-2-propanol; sulphur-containing methacrylates, such as ethylsulphinylethyl (meth)acrylate, 4-thiocyanatobutyl (meth)acrylate, ethylsulphonylethyl (meth)acrylate, thiocyanatomethyl (meth)acrylate, methylsulphinylmethyl (meth)acrylate, bis((meth)acryloyloxyethyl)sulphide; polyfunctional (meth)acrylates, such as butanediol dimethacrylate, glycerol tri(meth)acrylate, trimethylolpropane tri(meth)acrylate.

Alongside the (meth)acrylates described above, the compositions to be polymerized may also comprise other unsaturated monomers which are copolymerizable with the abovementioned (meth)acrylates. The amount generally used of these compounds is from 0 to 50% by weight, preferably from 0 to 40% by weight and particularly preferably from 0 to 20% by weight, based on the weight of the monomers, and the comonomers here may be used individually or in the form of a mixture.

Among these are, inter alia, 1-alkenes, such as 1-hexene, 1-heptene; branched alkenes, such as vinylcyclohexane, 3,3-dimethyl-1-propene, 3-methyl-1-diisobutylene, 4-methyl-1-pentene; vinyl esters, such as vinyl acetate; styrene, substituted styrenes having an alkyl substituent in the side chain, e.g. α-methylstyrene and α-ethylstyrene, substituted styrenes having an alkyl substituent on the ring, e.g. vinyltoluene and 2 p-methyestyrene, halogenated styrenes, such as mono-chlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinyl-pyrimidine, vinylpiperidine, 9-vinylcarbazole, 3-vinyl-carbazole, 4-vinylcarbazole, 1-vinylimidazole, 2-methyl-1-vinylimidazole, N-vinylpyrrolidone, 2-vinyl-pyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinyl-thiazoles and hydrogenated vinylthiazoles, vinyloxa-zoles and hydrogenated vinyloxazoles; vinyl ethers and isoprenyl ethers; and maleic acid derivatives, such as maleic anhydride, methylmaleic anhydride, maleimide, methylmaleimide; and dienes, such as 1,2-divinylbenzene, 1,3-divinylbenzene, 1,4-divinylbenzene, 1,2-diisopropenylbenzene, 1,3-diisopropenylbenzene and 1,4-diisopropenylbenzene.

The monomer composition for production of the polymethyl methacrylates particularly preferably encompasses monomers having groups which can absorb UV radiation.

Typical monomers of this type contain groups with high absorption in the wavelength range from 290 to 370 nm. Preference is given to monomers whose UV absorption in the form of a layer of thickness 5 mm of a solution in chloroform (spectroscopic quality) at concentration 0.002% by weight is at least 10%. Examples of suitable compounds are derivatives of 2-hydroxybenzophenone, of hydroxyacetophenone, of cyano-β,β-biphenyl, of hydroxy-benzoic esters, of oxanilide, of p-aminobenzoic esters or of the 6,8-dialkyl-4-oxo-5-chromanyl compound. The ethylenically unsaturated groups capable of free-radical polymerization present in these monomers preferably comprise acrylic, methacrylic, allyl or vinyl groups.

Examples of suitable monomers are:
2-(cyano-β,β-diphenylacryloyloxy)ethyl1-methacrylate
2-(2'-hydroxy-3'-methacrylamidomethyl-5'-octylphenyl)-benzotriazole
2-hydroxy-4-(2-hydroxy-3-methacryloyloxy)propoxy-benzophenone
2-(alpha-cyano-β,β-diphenylacryloyloxy)ethyl-2-methacrylamide
2-hydroxy-4-methacryloyloxybenzophenone
2-hydroxy-4-acryloyloxyethyloxybenzophenone
N-(4-methacryloylphenyl)-N'-(2-ethylphenyl)oxalamide
vinyl 4-ethyl-alpha-cyano-β-phenylcinnamate
2-(2-hydroxy-5-vinylphenyl)-2-benzotriazole.

The proportion of the UV-absorbent monomer in the polymethyl methacrylate can advantageously be selected to be sufficiently high that the foil layer absorbs at least 98% of the incident UV radiation whose wavelength is from 290 to 370 nm. The concentration required for this depends on the layer thickness and on the activity of the monomer. It is generally from 0.1 to 2% by weight, based on the weight of the monomers used for preparation of the polymethyl methacrylates.

The polymerization reaction is generally initiated by known free-radical initiators. Among the preferred initiators are, inter alia, the azo initiators well known to persons skilled in the art, e.g. AIBN and 1,1-azobiscyclohexanecarbonitrile, and also peroxy compounds, such as methyl ethyl ketone peroxide, acetylacetone peroxide, dilauroyl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl)peroxydicarbonate, mixtures of two or more of the abovementioned compounds with one another, and also mixtures of the abovementioned compounds with compounds not mentioned which can likewise form free radicals.

The amount often used of these compounds is from 0.1 to 10% by weight, preferably from 0.5 to 3% by weight, based on the total weight of the monomers.

Particularly preferred moulding compositions of this type are commercially obtainable from Cyro Inc. USA with the trademark Acrylite®.

The weight-average molar mass $M_w$ of the homo- and/or copolymers to be used according to the invention to produce the PMMA layer can vary widely, the molar mass usually being matched to the intended application and to the mode of processing of the moulding composition. However, it is generally in the range from 20 000 to 1 000 000 g/mol, preferably from 50 000 to 500 000 g/mol and particularly preferably from 80 000 to 350 000 g/mol, with no resultant intended restriction.

According to one particular aspect of the present invention, the moulding composition may, if appropriate, be rendered more mechanically stable via an impact modifier. These impact modifiers for poly-methacrylate plastics are well known and by way of example the preparation and the structure of impact-modified polymethacrylate moulding compositions are described inter alia in EP-A 0 113 924, EP-A 0 522 351, EP-A 0 465 049 and EP-A 0 683 028.

According to one particular aspect of the present invention, polymethyl methacrylates used for preparation of impact-modified moulding compositions may be those obtained via free-radical polymerization of mixtures which comprise from 80 to 100% by weight, preferably from 90 to 98% by weight, of methyl methacrylate and, if appropriate, from 0 to 20% by weight, preferably from 2 to 10% by weight, of other comonomers capable of free-radical polymerization and likewise listed above. Particularly preferred comonomers are, inter alia, $C_1$-$C_4$-alkyl (meth)acrylates, in particular methyl acrylate, ethyl acrylate or butyl methacrylate.

Impact-resistant polyalkyl (meth)acrylate moulding compositions preferably encompass polymethyl methacrylates whose average molar mass Mw is in the range from 20 000 to 350 000 g/mol, preferably from 90 000 g/mol to 200 000 g/mol, in particular from 100 000 g/mol to 150 000 g/mol.

Preferred impact-resistant moulding compositions comprise from 0.5 to 99% by weight, preferably from 50 to 95% by weight, particularly preferably from 60 to 90% by weight, of an impact modifier, based on the total weight of the impact-resistant moulding composition.

The impact modifier may be obtained in a manner known per se via bead polymerization or via emulsion polymerization.

Preferred impact modifiers are crosslinked particles whose average particle size is in the range from 50 to 1000 nm, preferably from 60 to 500 nm and particularly preferably from 80 to 120 nm.

Particles of this type can, by way of example, be obtained via the free-radical polymerization of mixtures which generally comprise at least 40% by weight, preferably from 50 to 70% by weight, of methyl methacrylate, from 20 to 80% by weight, preferably from 25 to 35% by weight, of butyl acrylate, and also from 0.1 to 2% by weight, preferably from 0.5 to 1% by weight, of a crosslinking monomer, e.g. of a polyfunctional (meth)acrylate, e.g. allyl methacrylate, and of comonomers which can be copolymerized with the abovementioned vinyl compounds.

Among the preferred comonomers are, inter alia, $C_1$-$C_4$-alkyl (meth)acrylates, such as ethyl acrylate or butyl methacrylate, preferably methyl acrylate, or other monomers capable of vinylic polymerization, e.g. styrene. The mixtures for preparation of the abovementioned particles may preferably encompass from 0 to 10% by weight, preferably from 0.5 to 5% by weight, of comonomers.

Particularly preferred impact modifiers are polymer particles which have a core-shell structure having two layers, particularly preferably three layers. EP-A 0 113 924, EP-A 0 522 351, EP-A 0 465 049 and EP-A 0 683 028 describe, inter alia, core-shell polymers of this type.

Particularly preferred impact modifiers based on acrylate rubber have, inter alia, the following structure:
Core: polymer with at least 90% by weight methyl methacrylate content, based on the weight of the core.
Shell 1: polymer with at least 80% by weight butyl acrylate content, based on the weight of the first shell.
Shell 2: polymer with at least 90% by weight methyl methacrylate content, based on the weight of the second shell.

Alongside the monomers mentioned, other monomers may be present in the core, and also in the shells. These monomers have been described above, and particularly preferred comonomers have crosslinking action.

By way of example, a preferred acrylate rubber modifier may have the following structure:
Core: copolymer composed of methyl methacrylate (95.7% by weight), ethyl acrylate (4% by weight) and allyl methacrylate (0.3% by weight)
S1: copolymer composed of butyl acrylate (81.2% by weight), styrene (17.5% by weight) and allyl methacrylate (1.3% by weight)
S2: copolymer composed of methyl methacrylate (96% by weight) and ethyl acrylate (4% by weight).

The core:shell(s) ratio of the acrylate rubber modifiers may vary within a wide range. The core:shell ratio C/S is preferably in the range from 20:80 to 80:20, with preference from 30:70 to 70:30 in the case of modifiers with one shell, or in the case of modifiers with two shells the core:shell 1:shell 2 ratio C/S1/S2 is preferably in the range from 10:80:10 to 40:20:40, particularly preferably from 20:60:20 to 30:40:30.

The particle size of the core-shell modifier is usually in the range from 50 to 1000 nm, preferably from 100 to 500 nm and particularly preferably from 150 to 450 nm, without any intended resultant restriction.

Impact modifiers of this type are commercially obtainable from Mitsubishi with the trade mark METABLEN® IR 441. It is also possible to obtain impact-modified moulding compositions.

DE 38 42 796 describes particularly preferred impact-resistant PMMA moulding compositions. These impact-resistant moulding compositions are based on an at least two-phase emulsion polymer which can be processed as it stands or in a blend with another moulding composition to give mouldings.

The hard phase of the emulsion polymer has a glass transition temperature of at least 70° C. and can be composed solely of methyl methacrylate. Comonomers which may be present, if appropriate, are lower alkyl acrylates, in particular those having from 1 to 4 carbon atoms in the alkyl radical, at a proportion of up to 20% by weight, based on the hard phase, as long as the glass transition temperature is not below that mentioned. The abovementioned monomers having groups which absorb UV radiation can preferably be used to prepare the hard phase.

At least 80% by weight, preferably more than 80% by weight, of the tough phase is composed of lower alkyl acrylates, the resultant glass transition temperature being below −10° C., generally from −20 to −80° C. As long as the required glass transition temperature is achieved it is possible, if appropriate, to make concomitant use, as is known from the prior art, of other aliphatic comonomers which are capable of free-radical polymerization and which can be copolymerized with the alkyl acrylates. The proportions of aromatic comonomers, such as styrene, alpha-methylstyrene or vinyltoluene, are preferably restricted to amounts which lead to no significant impairment of desired, or no significant undesired, properties of the moulding composition, especially on weathering.

The glass transition temperature (Tg) can, by way of example, be found in the literature reference Brandrup and E. H. Immergut, "Polymer Handbook", Interscience 1966, p III-61 to III-63, or "Kunststoff-Handbuch" [Plastics Handbook], Volume IX, Editor R. Vieweg and F. Esser, Carl-Hanser-Verlag, Munich 1975, pp. 333-339 and T. G. Fox in Bull. Am. Physics Soc., Vol. I, (3) p. 123 (1956). The glass transition temperature of the hard phase A) and that of the tough phase B) may moreover be determined via DSC.

The proportion of the graft-linking agent and, respectively, of the crosslinking agent which can be used in its place having three or more ethylenically unsaturated radicals capable of free-radical polymerization is selected within the limits of from 0.5 to 5% by weight in such a way that at least 15% by weight of the hard phase has covalent linking to the tough phase in the finished emulsion polymer. The degree of linkage becomes apparent on dissolving an aliquot of the emulsion polymer in a solvent for the hard phase. The tough phase remains undissolved here, as also does that proportion of the hard phase having covalent linking thereto. The weight of the undissolved fraction has to be greater by at least 15% by weight, preferably from 30 to 80% by weight, of the calculated weight of the hard phase than the calculated weight of the tough phase in the aliquot. However, the proportion of the graft-linking agent can never be less than 0.5% by weight, preferably being in the range from 1 to 4% by weight of the tough phase.

The proportion of the graft-linking agent in the inventive emulsion polymers is comparatively high and generally leads to sufficient crosslinking of the tough phase, therefore generally making it possible to omit any additional crosslinking agent. If the desired impact resistance properties are not achieved by this means, it can be advisable to use from 0.05 to 2% by weight of a crosslinking agent besides the graft-linking agent in the tough phase. In this case, the crosslinking agent must contain at least two acrylic or methacrylic radicals.

Preferred graft-linking agents are the allyl esters of acrylic or methacrylic acid, but other graft-linking agents mentioned in U.S. Pat. No. 3,808,180 and U.S. Pat. No. 3,843,753 are also suitable. Among the crosslinking agents having three or more ethylenically unsaturated radicals capable of free-radical polymerization, e.g. allyl groups or acrylic or methacrylic radicals which can be used in their place are triallyl cyanurate, trimethylolpropane triacrylate and trimethacrylate, pentaerythritol triacrylate and trimethacrylate and related compounds, other examples of which are given in DE-A 33 00 526.

Emulsion polymer having two or more phases is generated in a conventional manner via an aqueous-phase emulsion polymerization reaction involving two or more stages. The tough phase is generated in the first stage.

The tough-phase particle size is substantially dependent on the concentration of the emulsifier. Particles whose average particle size (weight average) is below 130 nm, preferably below 70 nm, and whose particle-size polydispersity is below 0.5, preferably below 0.2, are achieved at emulsifier concentrations of from 0.15 to 1.0% by weight, based on the aqueous phase. At lower amounts of emulsifier, the result is a larger average particle size, and at larger amounts of emulsifier the result is higher polydispersity. The shorter the duration of the phase of particle formation at the start of the emulsion polymerization, the lower the polydispersity—i.e. the greater the particle-size uniformity. Further particle formation after the start of the polymerization reaction is especially to be avoided, and this situation can arise if emulsifier is added subsequently. Particle size and particle-size polydispersity can also be affected by the polymerization rate; if the free-radical flux is too low, polydispersity is too high, and if free-radical flux is too high the result can be excessive moisture-sensitivity, especially if peroxide sulphates are used to initiate the polymerization reaction.

The emulsifier concentration mentioned applies especially to conventional anionic emulsifiers. Among these are, by way of example, alkoxylated and sulphated paraffins, which are particularly preferred.

An example of a polymerization initiator that may be used is from 0.01 to 0.5% by weight of alkali metal peroxide sulphate or ammonium peroxide sulphate, based on the aqueous phase, the initiation temperatures for the polymerization being from 20 to 100° C.

It is preferably possible to operate with redox systems, for example composed of from 0.01 to 0.05% by weight of organic hydroperoxides and from 0.05 to 0.15% by weight of Rongalit at temperatures of from 20 to 80° C.

The emulsion polymer is produced in the form of an aqueous dispersion whose solids content is from 30 to 60% by weight, and which generally comprises more than 0.05% by weight of water-soluble constituents, based on solids.

The water-soluble constituents are removed from the emulsion polymer by coagulating the dispersion, removing the liquid aqueous phase from the coagulate and melting the coagulate to give a moulding composition.

To colour the PMMA layer, at least one yellow anthraquinone dye is used. Yellow anthraquinone dyes are well known in the technical field and are commercially available. The term anthraquinone here indicates a well-known structural skeleton (cf. Roempp Chemielexikon [Roempp's Chemical Encyclopaedia] keyword "Anthrachinon" [Anthraquinone]). Suitable substitution gives the dye a yellow colour, the chromaticity coordinates (x;y) of the CIE1931 standard calorimetric system preferably being within the range $0.4 \leq x \leq 0.54$ and $0.44 \leq y \leq 0.54$, particularly preferably within the range of $0.47 \leq x \leq 0.52$ and $0.47 \leq y \leq 0.51$.

The chromaticity coordinates are measured on the basis of a PMMA foil whose thickness is 100 μm, the foil being produced via extrusion of a PMMA moulding composition with 1% by weight of dye, based on the total weight of the coloured moulding composition. The thickness of the foil is determined to DIN 53 370 (February 1976).

The concentration of the yellow dye in the PMMA layer of the inventive foils is at least 3% by weight, preferably at least 4% by weight, and particularly preferably at least 5% by weight, based on the total weight of the PMMA layer.

The PMMA layer of the inventive foils may encompass other dyes besides the yellow dye, but their concentration should not lead to any reduction in weathering resistance. In order to achieve a yellow or orange colour, the yellow dye is usually mixed with a red or orange dye. However, this procedure often leads to very low colour fastness on UV irradiation, meaning the chromaticity coordinates set out above for the foil become very markedly altered on irradiation with UV radiation. The use of a red dye is therefore preferably restricted to concentrations <0.1 percent by weight, preferably <0.01 percent by weight. It is particularly preferable to use no red dye. The chromaticity coordinates of the CIE1931 standard calorimetric system for a red dye (x;y) are generally within the range of $0.6 \leq x \leq 0.72$ and $0.2 \leq y \leq 0.38$.

According to one particular aspect of the present invention, a limited number of different dyes is used for colouring of the PMMA layer. It is preferable to use at most two dyes, and it is particularly preferable to use just one dye.

It is preferable to use a soluble dye. The solubility of the yellow dye in an organic solvent is preferably at least 0.05 percent by weight, particularly preferably at least 0.1 percent by weight and very particularly preferably at least 0.5 percent by weight at 25° C. The organic solvent here depends on the dye used, which can usually be found in the manufacturer's data. Among the organic solvents are in particular alcohols, aldehydes and ketones, esters and also dipolar aprotic solvents. Methyl methacrylate is particularly preferably used as solvent.

The following yellow dyes can in particular be used for colouring the PMMA layer: Solvent Yellow 93, 112, 113, 128, 129, 130 and 163. It is particularly preferable to use the dye Solvent Yellow 163. The names of these dyes derive from Color Index I or II, each numeral representing a specific dye.

Disperse dyes may also be used for the colouring process. In particular, Disperse Yellow 54, 64 and 160 are particularly suitable.

These dyes are obtainable from one or more of the following companies: BASF, Bayer AG, Colour Chem International and Mitsubishi Chemical Industries. The dye Solvent Yellow 163 is particularly suitable and is obtainable from Ciba Specialties under the name Oracet Yellow GHS and also from Clariant with the commercial name Polysynthren Yellow GS.

The PMMA layer of the foil can moreover encompass other well-known additives. Among these are, inter alia, antistatic agents, antioxidants, flame retardants, lubricants, flow improvers, fillers, light stabilizers and organophosphorus compounds, such as phosphites or phosphonates, weathering stabilizers and plasticizers.

The coloured PMMA layer has a yellow colouration, and the chromaticity coordinates (x;y) in the CIE1931 standard calorimetric system are preferably within the range $0.4 \leq x \leq 0.54$ and $0.44 \leq y \leq 0.54$, particularly preferably within the range of $0.47 \leq x \leq 0.52$ and $0.47 \leq y \leq 0.51$.

The chromaticity coordinates are measured using 0/45 geometry and evaluated using CIE standard illuminant D65. The method of measurement and evaluation is well known and is described by way of example in DIN 5033/5036.

The inventive foil can consist of a PMMA layer. The inventive foil can moreover encompass other layers. Among these are in particular layers which encompass reflective bodies, e.g. reflective-coated or partially reflective-coated transparent, transluscent or opaque particles, such as glass particles. These composites usually encompass at least one PMMA layer and also a layer composed of other polymers, in particular of polyolefins, which comprise the above-mentioned reflective bodies. There is also a layer which is composed of adhesive and which is generally applied opposite to the PMMA layer, the layer composed of polyolefins therefore being between the adhesive layer and the PMMA layer.

The production of these foils is well known, as also are other embodiments of these foils, this being described, inter alia, in EP-A-0609880 and also in the prior art set out therein.

The foil, in particular the PMMA layer of the foil, can be produced in any known manner. The PMMA layer is particularly preferably produced via extrusion, where a moulding composition encompassing PMMA is melted and is mixed with at least one yellow anthraquinone dye and is extruded to give a foil. The process parameters needed for this purpose are known from the prior art, e.g. from EP-A-0659829. The resultant PMMA layer can then be bonded in a known manner to other layers. An example of a process for this purpose is lamination. This is described inter alia in EP-A-0 609 880.

The thickness of the PMMA layer of the inventive foils is preferably in the range from 50 μm to 150 μm, particularly preferably 60 μm to 125 μm. The thickness of the foil can be measured to DIN 53 370 (February 1976).

The PMMA layer of the inventive foil has excellent mechanical properties. For example, the PMMA layer can preferably have a modulus of elasticity to ISO 527 in the range from 500 to 3200 MPa, particularly preferably in the range from 800 to 2700 MPa.

The tensile strength of the PMMA layer of an inventive foil can preferably be in the range from 30 to 75 MPa, particularly preferably in the range from 50 to 70 MPa, and the tensile strength here can be measured to ISO 527.

The inventive foil, in particular the PMMA layer of the foil, moreover has excellent transmittance. For example, the transmittance of the PMMA layer is preferably at least 60%, more preferably at least 65 to 75%, and the transmittance here can be measured to DIN 5036.

The PMMA layer of the inventive foil moreover has excellent weathering resistance. For example, the colour change after Xenotest 1200 weathering, utilizing the ISO 105 A 02 grey scale, is at least rating 3, preferably at least rating 4 after 5000 hours, preferably after 6000 hours, of Xenotest.

The inventive foil can encompass other layers besides the PMMA layer and besides a layer encompassing reflectors. Among these are in particular a scratch-resistant layer composed of a highly crosslinked plastic.

If the laminated moulding has exposure to mechanical stress, a scratch-resistant coating is advantageous. A wide variety of processes is known for improving the scratch resistance of plastics surfaces. They are mainly based on coating of the polyethylenically unsaturated monomer to coat the surface requiring protection, and curing this monomer via free-radical polymerization, e.g. via exposure to UV radiation impacting a photoinitiator dissolved in the coating. This type of system is described by way of example in DE-C 29 28 512.

The monomers for forming the scratch-resistant layer have at least two, and rarely more than six, polymerizable double bonds. These can be present in acryloyl, methacryloyl, vinyl, allyl or methallyl radicals. Preference is given to esters of acrylic or methacrylic acid with polyhydric aliphatic alcohols. These generally contain from 2 to 10 carbon atoms and from 2 to 6 hydroxy groups, some or all of which may have been esterified.

Examples of these monomers are ethylene glycol diacrylate and ethylene glycol dimethacrylate, propylene 1,2-glycol diacrylate and propylene 1,2-glycol dimethacrylate, butylene 1,2-glycol diacrylate, butylene 1,2-glycol dimethacrylate, butylene 1,4-glycol diacrylate and butylene 1,4-glycol dimethacrylate, glycerol triacrylate and glycerol trimethacrylate, pentaerythritol triacrylate and pentaerythritdl tetraacrylate, pentaerythritol trimethacrylate and pentaerythritol tetramethacrylate, trimethylolpropane triacrylate and trimethylolpropane trimethacrylate, and also the acrylic esters of dipentaerythritol. Because the esters of acrylic acid polymerize more rapidly and more completely than those of methacrylic acid among the esters mentioned, it is particularly advantageous to use only the acrylates or at most mixtures of acrylates and methacrylates, the former being markedly predominant and the latter making up not more than 30% by weight, preferably not more than 15% by weight. Monomers whose boiling points are above 140° C. are preferred.

Among the polyfunctional monomers, those having three or more carbon double bonds lead to particularly high crosslinking density and correspondingly good scratch resistance. However, because their viscosity is mostly high they are difficult to process in pure form at room temperature. The viscosity can be reduced via a proportion of bifunctional monomers. This can also be achieved via addition of monofunctional monomers which, although they do not contribute to crosslinking, lead to increased flexibility of the scratch-resistant layer. Examples which may be mentioned of monofunctional monomers are styrene, acrylonitrile, methacrylonitrile, monoalkyl esters of acrylic and methacrylic acid having from 1 to 10 carbon atoms in the alkyl radical or having substituted alkyl radicals which may, for example, bear hydroxy groups as substituents. The proportion of the mono- and bifunctional monomers can be raised as far as 70% by weight of the monomer mixture to obtain an advantageous processing viscosity and high flexibility of the scratch-resistant coating, while the proportion of the tri- or polyfunctional monomers should not be below 30% by weight, to obtain high scratch resistance. Surprisingly, the monomer mixture can comprise up to 30% by weight of acrylic acid or methacrylic acid without impairment of scratch resistance. The viscosity of the liquid monomer mixture is advantageously not above 100 mPa*s (measured at 20° C.).

Another process for production of a scratch-resistant coating which at the same time has antireflection properties is known from EP-B 180 129. It is based on the hardening of a thin layer composed of organosilicon compounds or composed of melamine resins on the plastics surface.

Finally, a scratch-resistant coating can also be generated via plasma polymerization of vaporized silanes or siloxanes in the presence of oxidizing gases.

The outermost layer of the foil is preferably printable. Further priming or treatment of the foil can be necessary for this purpose and is known to persons skilled in the art.

The inventive foils are particularly suitable for production of retroreflective mouldings, for example for production of traffic signs.

The present invention is illustrated in more detail below using a comparative example and an inventive example, but there is no intention of any resultant restriction.

COMPARATIVE EXAMPLE 1

A PMMA foil was produced via extrusion and colouring of a PMMA moulding composition. An impact-resistant moulding composition (prepared according to DE 3842796, Inventive Example 1) was coloured using a mixture of a yellow anthraquinone dye (Solvent Yellow 163) and an orange dye (Oracetorange LPG). The concentration of the yellow anthraquinone dye was 0.8% by weight, and that of the orange dye was 0.52% by weight.

The coloured moulding composition was extruded to give a foil whose thickness was 100 μm, and was exposed to a Xenotest 1200. After 2000 hours, a marked fading of the colouring occurred, whereupon transmittance increased. The chromaticity coordinate x was initially 0.515, the y coordinate being 0.474. After 2000 hours of weathering, the chromaticity coordinate x was 0.497, and the y coordinate was 0.481.

Comparative Example 1 was substantially repeated, but the moulding composition was not coloured using a dye mixture, but using a high concentration of the soluble dye Solvent Yellow 163. Accordingly, the impact-resistant PMMA moulding composition was coloured with five percent by weight of the dye Solvent Yellow 163. This moulding composition was extruded to give a foil whose thickness was 100 μm. The initial chromaticity coordinate x was 0.512, and the y coordinate was 0.483. After 2,000 hours of weathering, the x chromaticity coordinate was 0.513, and the y coordinate was 0.482.

It is apparent from this that the inventive foils have substantially higher weathering resistance, i.e. colour fastness, at a similar chromaticity coordinate.

The invention claims is:

1. A foil comprising at least one polymethyl methacrylate layer colored with a yellow anthraquinone dye, where the chromaticity coordinates (x;y) in the CIE1931 standard colorimetric system of the polymethyl methacrylate layer are preferably within the range of $0.4 \leq x \leq 0.54$ and $0.44 \leq y \leq 0.54$, wherein the concentration of the yellow dye in the polymethyl methacrylate layer is at least 3% by weight, based on the total weight of the polymethyl methacrylate layer.

2. A foil according to claim 1, wherein the polymethyl methacrylate layer comprises at least one impact modifier.

3. A foil according to claim 2, wherein the impact modifier is obtained via emulsion polymerization.

4. The foil according to claim 1, wherein the polymethyl methacrylate layer comprises a molding composition comprising A) from 10 to 90% by weight of a coherent hard phase with a glass transition temperature above 70° C., encompassing
   a) from 80 to 100% by weight (based on A) of methyl methacrylate and
   b) from 20 to 0% by weight of a lower alkyl acrylate, and
B) from 90 to 10% by weight of a tough phase distributed within the hard phase and having a glass transition temperature below −10° C., and an average tough-phase particle size below 130 nm and a tough-phase particle-size polydispersity of less than 0.5, comprising
   c) at least 50% by weight (based on B) of a lower alkyl acrylate,
   d) from 0.5 to 5% by weight of a graft-linking agent or of a crosslinking monomer having three or more ethylenically unsaturated radicals capable of free-radical polymerization.

5. The foil according to claim 4, wherein at least 15% by weight of the hard phase has covalent linking to the tough phase.

6. The foil according to claim 1, wherein the polymethyl methacrylate layer comprises a polymethyl methacrylate molding composition that is obtained via polymerization of one or more monomer mixtures that comprises one or more monomers having groups that absorb UV radiation.

7. The foil according to claim 1, wherein the chromaticity coordinates of the yellow anthraquinone dye (x;y) to CIE 1931 Standard Colorimetric Systems are within the range of $0.4 \leq x \leq 0.54$ and $0.44 \leq y \leq 0.54$.

8. The foil according to claim 1, wherein the yellow anthraquinone dye is soluble in an organic solvent.

9. The foil according to claim 1, wherein the yellow dye is Solvent Yellow 163.

10. The foil according to claim 1, wherein the thickness of the polymethyl methacrylate layer is in the range from 50 μm to 150 μm.

11. The foil according to claim 1, wherein the foil has been bonded to a retroreflective substrate.

12. The foil according to claim 1, further comprising a scratch-resistant layer comprising a highly crosslinked plastic arranged on a surface of the foil.

13. The foil according to claim 1, wherein the modulus of elasticity of the polymethyl methacrylate layer is in the range from 500 to 3200 MPa.

14. The foil according to claim 1, wherein the weathering resistance of the polymethyl methacrylate layer is at least 2200 hours to ASTM D4956-95, section 7.4.

15. A process for production of a foil according to claim 1, comprising
   mixing a yellow anthraquinone dye with a polymethyl methacrylate molding composition to form a material, and
   extruding the material.

16. A retroreflective molding comprising at least one foil according to claim 1.

17. A traffic sign comprising a foil according to claim 1.

18. The foil according to claim 1, wherein the chromaticity coordinates are within the range of $0.47 \leq x \leq 0.52$ and $0.47 \leq y \leq 0.51$.

19. The foil according to claim 14, wherein the yellow anthraquinone dye is 1,8-bis(phenylthio)-anthraquinone.

* * * * *